US008505598B2

(12) United States Patent
Marsaly et al.

(10) Patent No.: US 8,505,598 B2
(45) Date of Patent: Aug. 13, 2013

(54) WHEEL DISASSEMBLY SAFETY DEVICE

(75) Inventors: Olivier Marsaly, Princeton, NJ (US);
Larry K. Rogers, Bordentown, NJ (US);
Peter K. Hobe, Levittown, PA (US)

(73) Assignee: Hutchinson, S.A., Paris (FR)

( * ) Notice: Subject to any disclaimer, the term of this patent is extended or adjusted under 35 U.S.C. 154(b) by 287 days.

(21) Appl. No.: 12/786,094

(22) Filed: May 24, 2010

(65) Prior Publication Data
US 2011/0057503 A1    Mar. 10, 2011

Related U.S. Application Data

(60) Provisional application No. 61/273,141, filed on Jul. 31, 2009.

(51) Int. Cl.
*B60B 25/22* (2006.01)
(52) U.S. Cl.
USPC ......... 152/405; 152/427; 152/396; 301/95.11
(58) Field of Classification Search
USPC .................. 152/396, 402, 405, 427; 301/9.1, 301/10.1, 11.1, 95.11
See application file for complete search history.

(56) References Cited

U.S. PATENT DOCUMENTS

| | | | | |
|---|---|---|---|---|
| 2,229,724 A | * | 1/1941 | Burger et al. | 152/404 |
| 2,252,194 A | * | 8/1941 | Mills | 152/409 |
| 2,428,551 A | * | 10/1947 | Burger | 152/409 |
| 3,831,658 A | | 8/1974 | Poplawski | |
| 3,882,919 A | * | 5/1975 | Sons et al. | 152/410 |
| 3,990,494 A | | 11/1976 | Stambaugh et al. | |
| 4,043,374 A | | 8/1977 | Smith | |
| 4,123,112 A | | 10/1978 | Mills | |
| 4,196,765 A | | 4/1980 | Heuer et al. | |
| 4,836,261 A | * | 6/1989 | Weeks et al. | 152/405 |
| 5,343,920 A | * | 9/1994 | Cady | 152/396 |
| 7,083,238 B2 | * | 8/2006 | Clements et al. | 301/11.1 |

(Continued)

FOREIGN PATENT DOCUMENTS
WO    WO2006061465    6/2006

OTHER PUBLICATIONS

Extended European Search Report for corresponding European Application No. EP10169848 dated Sep. 8, 2011.

*Primary Examiner* — Kip T Kotter
(74) *Attorney, Agent, or Firm* — Reed Smith LLP

(57) ABSTRACT

The instant invention is a pressure release safety system for a multi-piece wheel rim and tubeless tire combination, teaching designs for automatically relieving/releasing pressure as part of its disassembly. In this invention, fastening elements used to hold together portions of a wheel rim are provided with a blocking device or devices that prevents loosening and/or removal of fastening elements until said blocking device is first moved from a blocking position, where movement of the blocking device from its blocking position directly or indirectly opens or requires the opening of a pressure relief channel or channels—allowing, enabling and effecting depressurization of the sealed pressure vessel. When applied in the context of a tubeless two-piece wheel/tire assembly, the invention advantageously may include a blocking or safety device (typically in the form of a ring) that covers all or a critical portion of the nuts/studs that hold the two piece wheel together. The act of removing the safety ring so as to access and remove the nuts from the studs to disassemble the wheel, opens an air channel in communication with the tire interior so as to allow pressure to escape from the tire interior.

20 Claims, 19 Drawing Sheets

(56) References Cited

U.S. PATENT DOCUMENTS

| | | | |
|---|---|---|---|
| 7,650,920 B2 * | 1/2010 | Koivula | 152/427 |
| 7,779,877 B2 * | 8/2010 | Putz et al. | 152/405 |
| 8,087,439 B2 * | 1/2012 | Hobe et al. | 152/418 |
| 2006/0037685 A1 | 2/2006 | Clements et al. | |

* cited by examiner

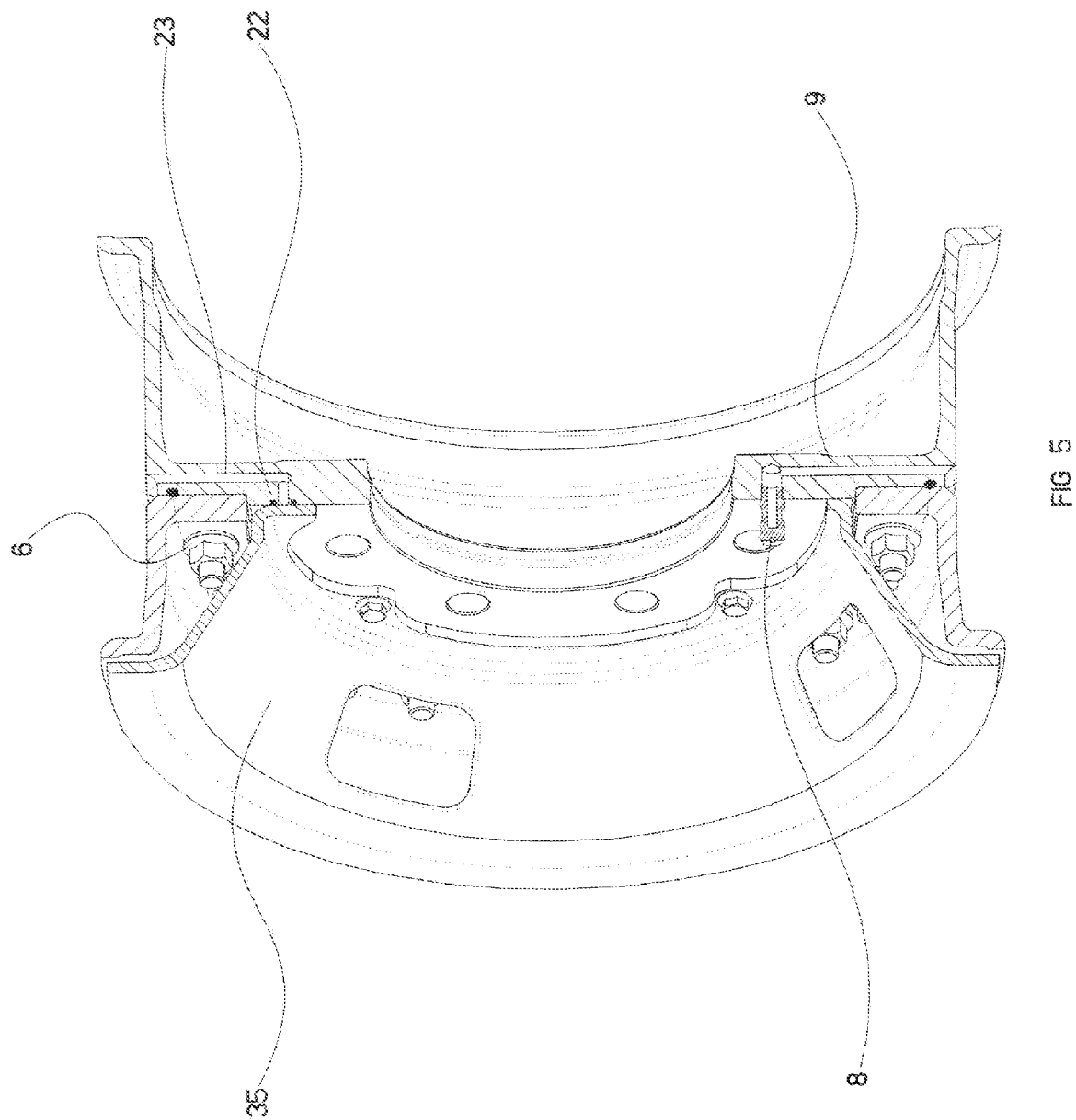

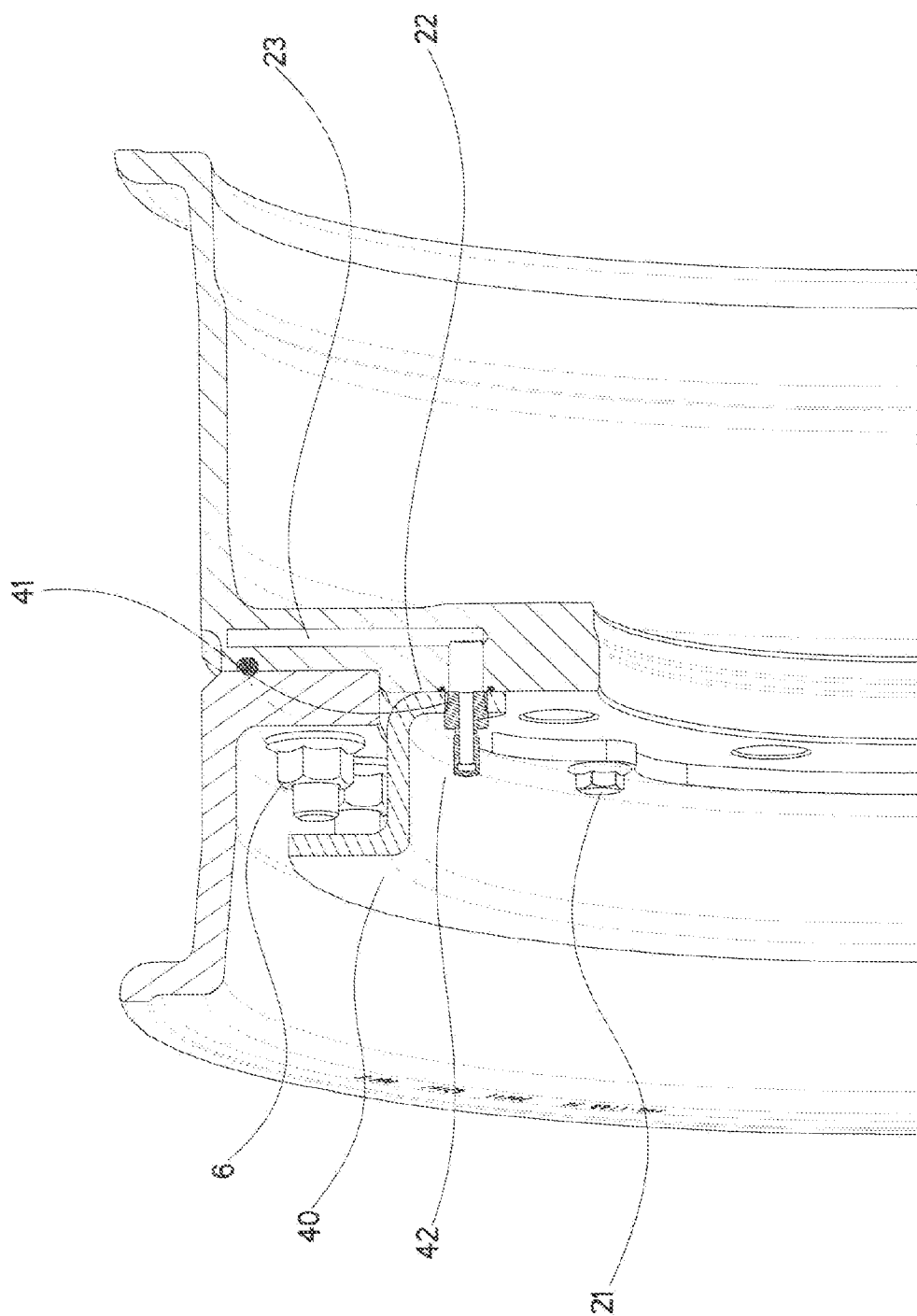

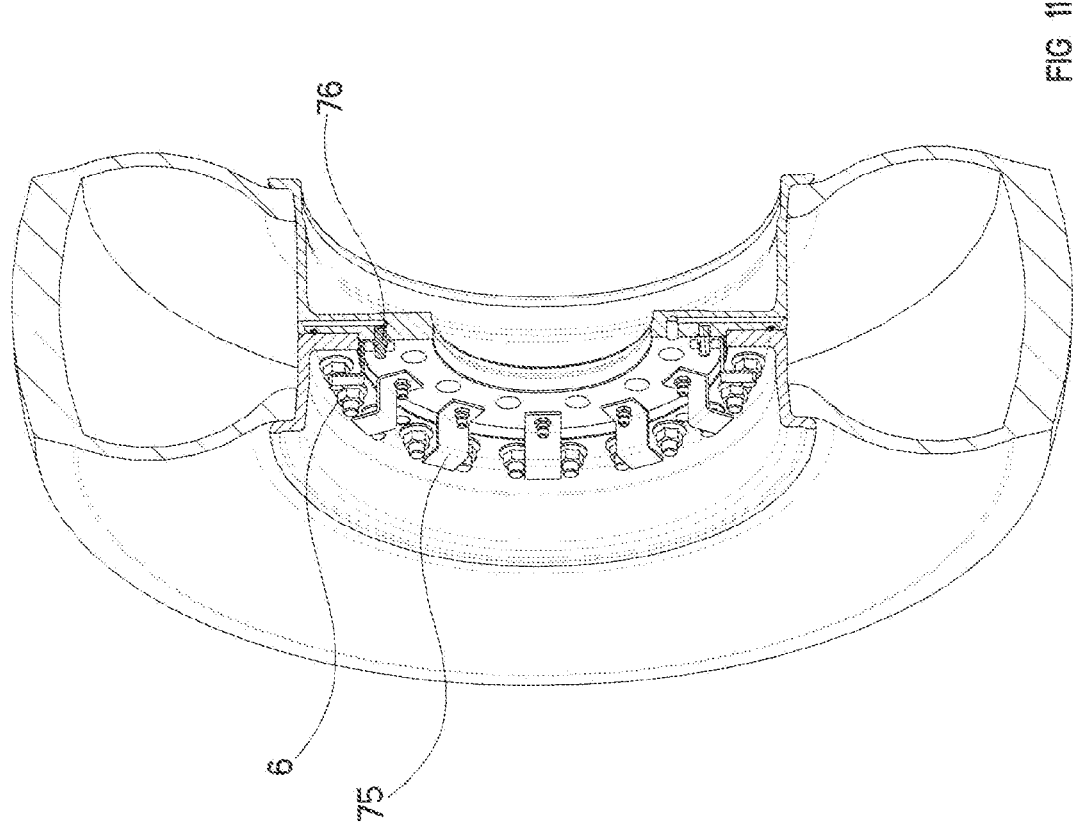

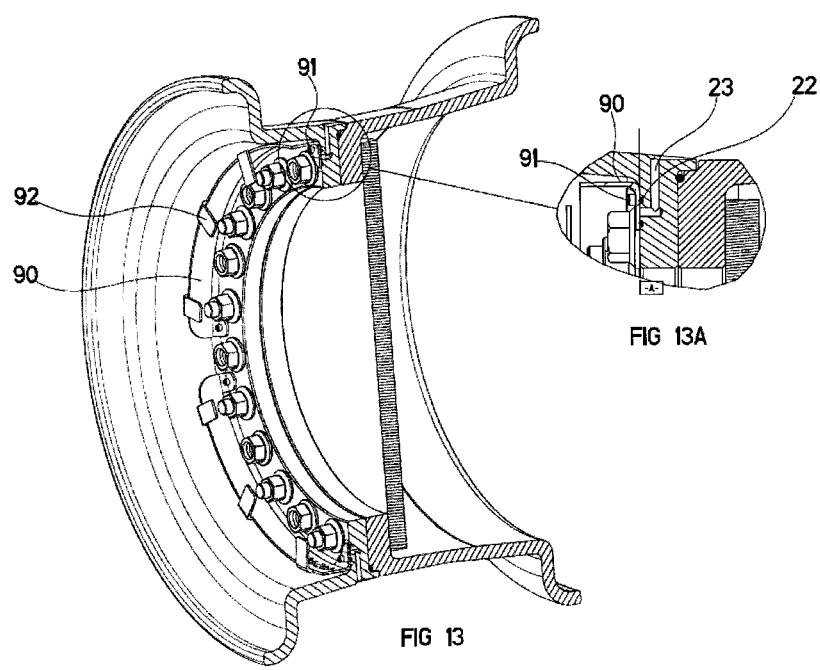

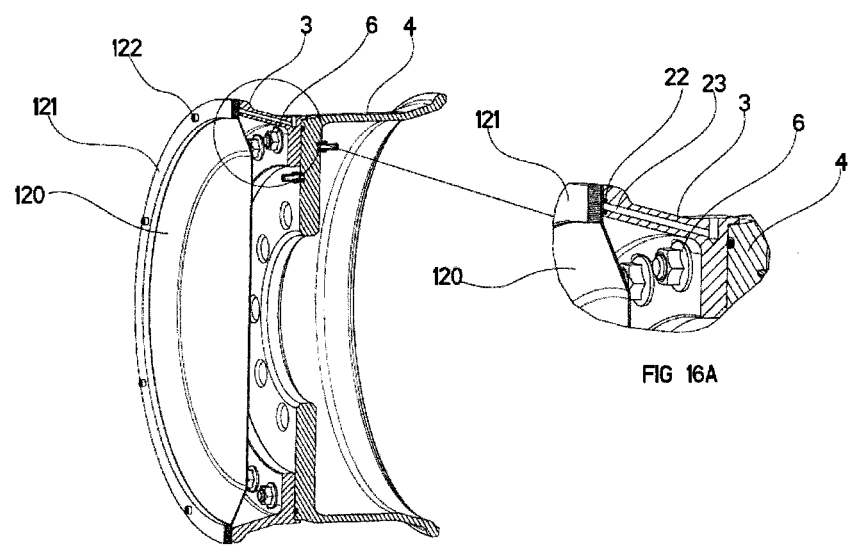

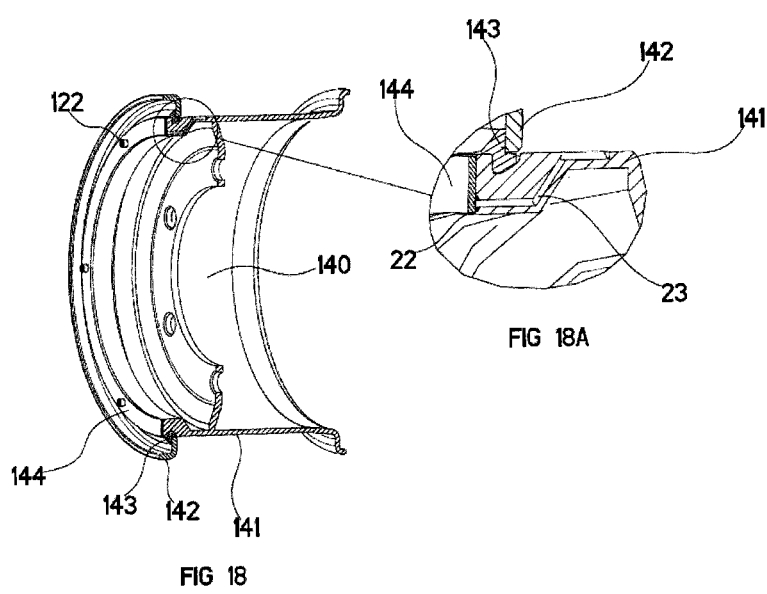

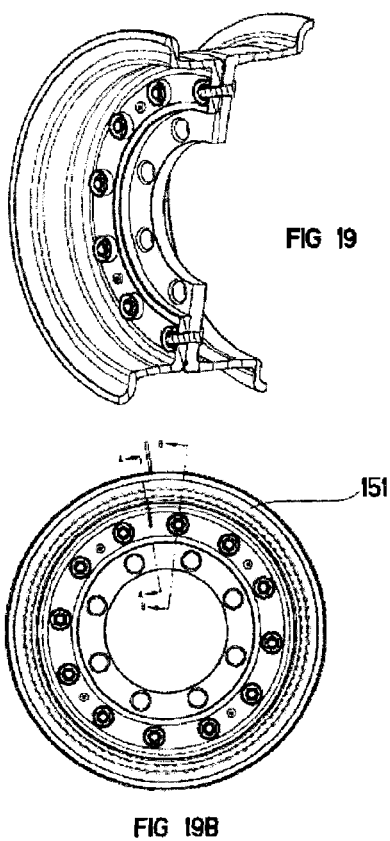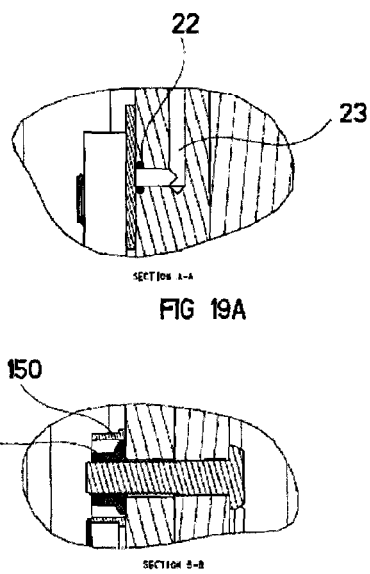
FIG 19
FIG 19A
FIG 19B
FIG 19C

WHEEL DISASSEMBLY SAFETY DEVICE

RELATED APPLICATIONS

This application claims an invention that was disclosed in U.S. Provisional Application No. 61/273,141, filed 31 Jul. 2009, entitled "Wheel Disassembly Safety Device". The benefit under 35 USC §119(e) and/or other applicable law of the aforesaid United States provisional application is hereby claimed, and the aforementioned application is hereby incorporated herein by reference.

BACKGROUND AND SUMMARY

The purpose of this invention is to provide a safety device that relieves the pressure from a pressurized tire before removal of key components that could cause a catastrophic failure if removed while pressure remains in the tire. A typical example of the need and purpose of the invention is presented by a tubeless tire mounted on a two-piece rim. In this situation, if the assembly nuts are removed without deflating the tire first, a catastrophic failure of the remaining fasteners may occur after some of the nuts are removed, causing injury to the personnel disassembling the tire/wheel combination. Thus, a primary application of the instant invention is avoiding disastrous and sometimes explosive decompression of inflated tires on the disassembly of a two piece wheel assembled to an inflated tire.

FIG. 1 shows a typical two piece wheel assembly without a central tire inflation valve. The two-piece wheel assembly 1 includes a tire 2 with a body portion 2A and an inner cavity 2B containing a pressurized fluid (usually air). The wheel assembly 1 includes a rim portion 1A formed coaxially on opposite ends thereof with outwardly flaring circumferential flange sections disposed to be engaged by the beads of tubeless tire 2. A transverse wall section, disc portion 1B, extends transversely of the axis of the wheel assembly 1 and its rim 1A, and includes a central opening (hub bore area 1C) disposed coaxially on said axis. The wall section of two-piece wheels (disc portion 1B) includes two major parts, an outer portion (or rim half) 3 and an inner portion (or rim halt) 4. The two portions/halves 3 and 4 are held together by fastening elements such as assembly studs 5 which extend through overlapping portions of the two rim halves 3 and 4 and assembly nuts 6 and sealed with a wheel sealing o-ring 7 placed between confronting surfaces of the two portions 3 and 4 so as to prevent air from escaping out of tire air chamber 2B (thereby creating a sealed space including tire cavity/chamber 2B). An inflation valve 8 is in communication with cavity 2B via an internal passageway 9, allowing controlled ingress and egress of air (or other fluids) for inflation/deflation purposes.

With this type of construction, if some of the fastening elements such as assembly nuts 6 are disassembled from studs 5, pressure is sometimes relieved in a manner that avoids the previously described consequences. This is due to the fact that loosening of some of the assembly nuts 6 may allow the outer portion 3 of the wheel assembly 1 to deflect enough that the o-ring 7 seal can leak and relieve pressure. However, as wheels become stronger and stiffer to carry higher loads or higher inflation pressures, the wheel halves 3, 4 also become stronger and stiffer. In this case, removing some of the assembly nuts 6 may not allow the wheel components to deflect sufficiently to release trapped air and alleviate the air pressure issue. (This is a particular problem on very large wheels and tires used for industrial applications, such as tires used on earth moving equipment, but it can also be a problem in smaller wheels and tires). In this case, after a number of the assembly nuts 6 are removed, the remaining studs 5 and nuts 6 holding the wheel assembly 1 together may fail catastrophically injuring the personnel disassembling the unit.

FIG. 2 shows a two piece wheel assembly 10 and tire with a central tire inflation (CTI) valve 11. The construction of wheel 10 is the same as the one shown in FIG. 1, except it has the CTI valve 11 added. The CTI valve 11 is a device used to control the pressure in tire cavity 2B according to a controlled setting from the cab of the vehicle via internal passageways 12, 13. However, these systems only cover specific pressures and the valve 11 does not totally relieve the pressure in the tire cavity 2B, and cannot serve as a safeguard in the situations outlined herein. Other means have also been sought to relieve the pressure in the tire such as that described in U.S. Pat. No. 5,343,920. This system describes special assembly studs and nuts that are designed to relieve the pressure in the tire if any of the assembly nuts are removed from the vehicle. However, this system also has numerous disadvantages. First, the assembly is complex, requiring a multiplicity of components that can fail. Second, studs are weakened by the o-ring sealing device of the aforesaid system. Third, the assembly nuts may have to be oversized in order to seal air pressure in the system. Fourth, multiple assembly studs must have the sealing device and corresponding cross-drills into the tire cavity. Fifth, there are multiple leak points which reduce the liability of the system. Sixth, the design of the studs and nuts is complex, adding to the cost of this system.

The instant invention resolves and avoids these difficulties by teaching designs for automatically relieving/releasing pressure from a sealed tubeless wheel/tire assembly as part of its disassembly. Thus, in the instant invention, wheels having fastening elements comprising mechanical holding apparatus such as nuts and bolts (or studs) used to hold together two parts to seal the vessel comprised of the rim and a tubeless tire mounted thereon are provided with a blocking device that prevents loosening and/or removal of said nuts, bolts and/or other mechanical holding apparatus serving as fastening element(s) until said blocking device is first removed from its blocking position. Removal directly or indirectly causes or requires the opening of a pressure relief channel or channels, which is/are advantageously formed by an air passageway in the rim, allowing, enabling and/or effecting depressurization of the sealed pressure vessel. The foregoing features and others of the inventive concept, as more fully described below, provide numerous advantages over the systems of prior art. To begin with, the described inventive concept and its variations is/are (in contrast to prior art) durable, reliable, relatively simple in construction and operation, and virtually fool-proof in terms of avoiding and preventing the types of explosive and catastrophic failures described above. The numerous other advantages of our invention will become more apparent in view of the more detailed description and claims that follow.

BRIEF DESCRIPTION OF THE DRAWINGS

FIG. 5 provides a schematic perspective and partial cross-sectional view illustrating an embodiment of the invention featuring a safety ring incorporated into and/or in combination with a huh cap or wheel cover.

FIG. 6 provides a schematic perspective and partial cross-sectional view illustrating an embodiment of the invention featuring the inflation valve directly attached to the safety ring.

FIG. 11 provides a schematic perspective and partial cross-sectional view illustrating an embodiment of the invention featuring individual safety pieces as opposed to a safety ring.

FIGS. 13 and 13A collectively provide a schematic perspective and partial cross sectional view illustrating an embodiment of the invention featuring a safety ring divided into sections and having tabs to block disassembly.

FIGS. 16 and 16A collectively provide a schematic perspective and partial cross sectional view illustrating a cover that can prevent disassembly of the wheel halves if the tire is pressurized.

FIGS. 18 and 18A collectively provide a schematic perspective and partial cross sectional view illustrating a multi piece wheel with the safety ring feature.

FIGS. 19, 19A, 19B and 19C collectively provide a schematic perspective and partial cross sectional view illustrating a device that prevents removal of the assembly nuts 6 by blocking wrench access.

DESCRIPTION

Figure 3:
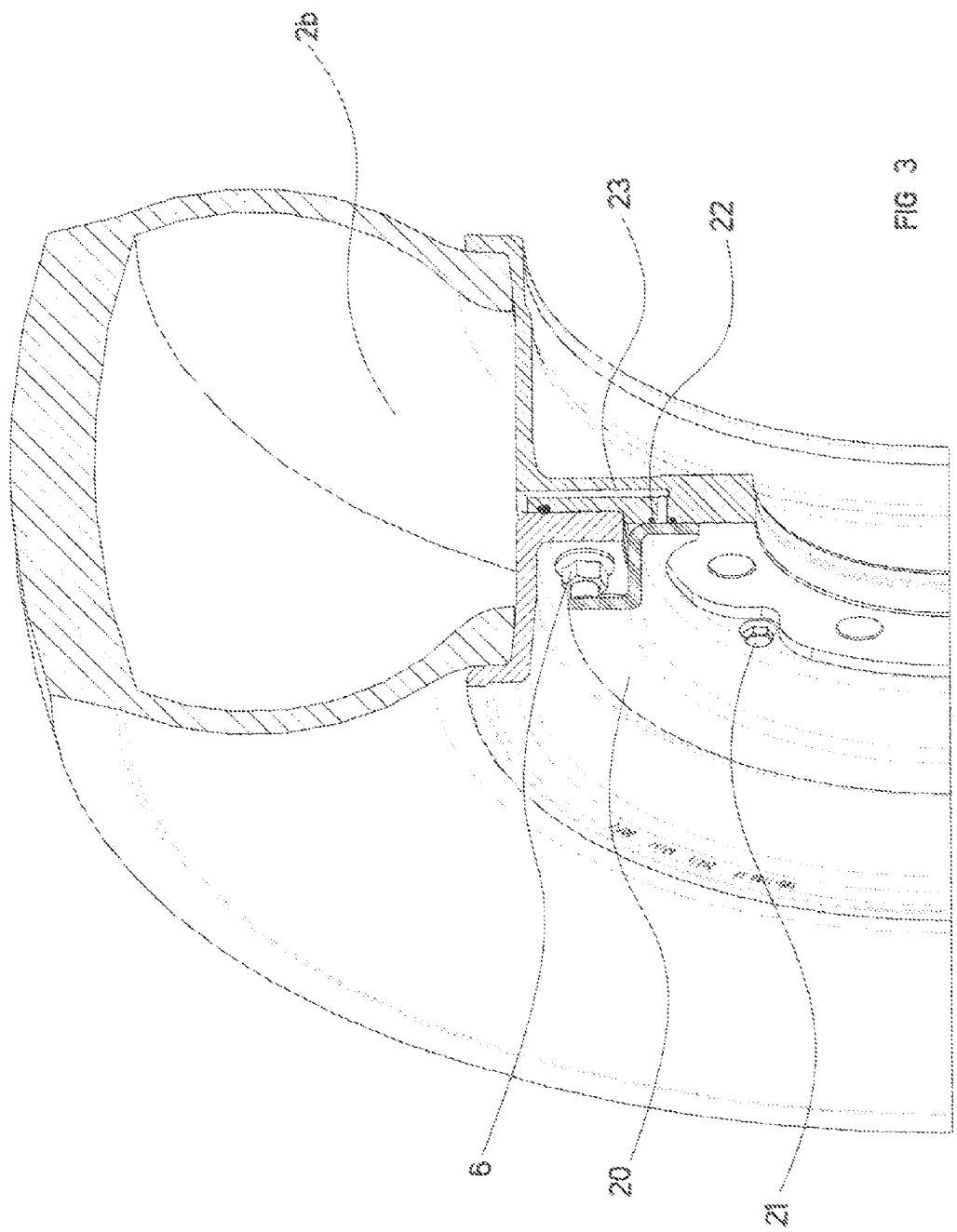
FIG. 3 provides a schematic perspective and partial cross-sectional view illustrating an embodiment of the invention featuring a safety ring that must be removed prior to removing the assembly nuts.

In FIG. 3 the blocking device of the invention takes the form of a safety ring 20 that must be removed prior to removing the assembly nuts 6. The safety ring 20 illustrated covers the assembly nuts 6 so that the assembly nuts 6 cannot be removed without first removing the safety ring 20. In the illustration shown, the safety ring is held in place by cap screws 21. The safety ring 20 also directly abuts air passageway 23, holding a sealing o-ring 22 in place. As shown in FIG. 3, one end/opening of the air passageway 23 is at an outer face of the transverse wall section. This arrangement serves to seal pressure from the tire cavity 2B from escaping under normal use. However, if disassembly is attempted without first depressurizing the tire 2, removal of the safety ring 20 is required in order to access and remove nuts 6 from studs 5 and disassemble the wheel 1. Removal of ring 20 unseals and opens air passageway 23, allowing air to escape from the tire cavity 2B to the atmosphere in a controlled and safe manner. (A plurality of air channels can be used for this purpose, but only one is necessary to illustrate the inventive concept).

Figures 4, 4A:
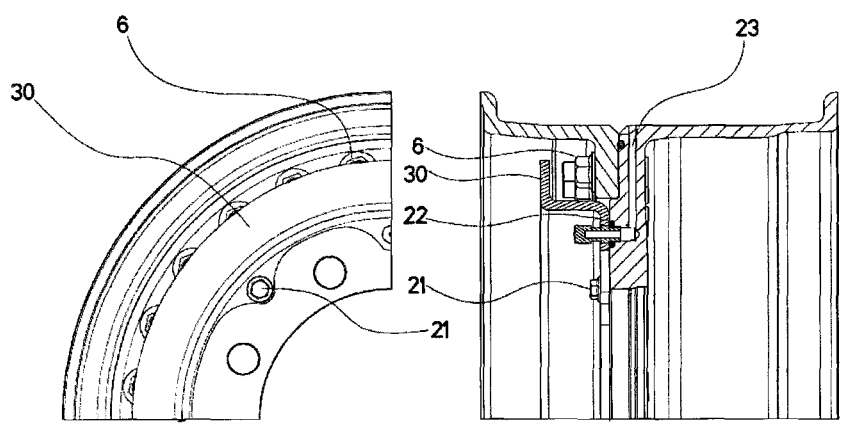
FIGS. 4 and 4A collectively provide schematic partial side and cross-sectional views illustrating an embodiment of the invention featuring a safety ring which only partially covers the assembly nuts.

The embodiment of FIG. 4, like that of FIG. 3, features a safety ring that directly abuts air passageway 23. However, the modified safety ring 30 of FIG. 4 only partially covers the assembly nuts 6. The assembly nuts 6 still cannot be removed without removing the modified safety ring 30 first, making clear the fact that a blocking device can be effective for its purposes without completely covering the mechanical holding apparatus of a sealed vessel (such as nuts 6). Further, though assembly nuts 6 are shown in FIG. 3 and FIG. 4, a blocking device such as safety rings 20, 30 could be used to cover any type of mechanical holding apparatus, assembly fastener or assembly ring such as assembly cap screws, side rings or lock rings. In addition, as illustrated in FIG. 5, the blocking device or safety ring can be incorporated into a combined safety ring and hub cap/wheel cover configuration 35 as well.

Figure 7:
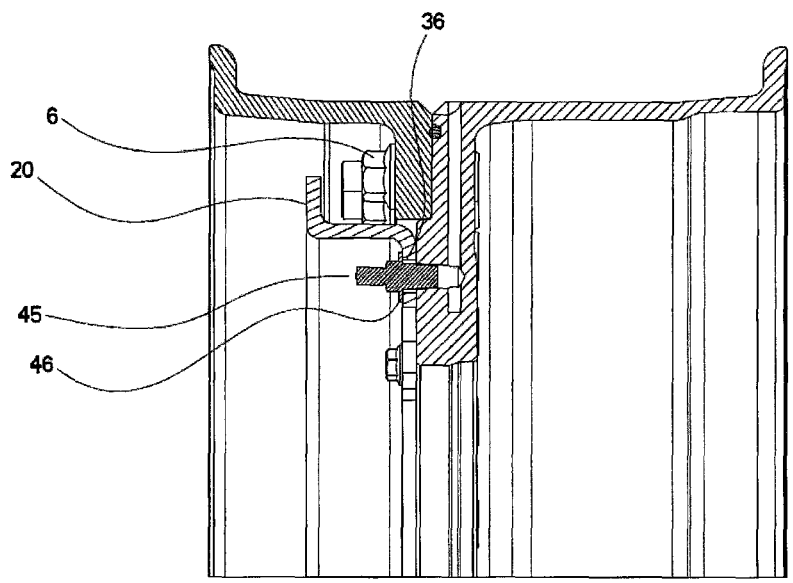
FIG. 7 provides a schematic partial cross-sectional view illustrating an embodiment of the invention featuring an inflation valve with a flange mounted through the safety ring.

FIGS. 6 through 9 illustrate variations where the blocking device interacts with, is based upon, includes and/or is incorporated into a pressurization/depressurization valve in communication with tire cavity 2B. Thus, in FIG. 6, an example is provided of an inflation valve 42 directly attached to a safety ring 40 (which is modified for this purpose by the inclusion of a suitable aperture with threads 41 for use in mounting valve 42). In this case, the removal of the safety ring 40 will unseal the air passageway 23 normally used for inflation/deflation of tire 2 via inflation valve 42. This variation is advantageous as it does not require the provision of special air passageways in conjunction with the blocking device, but is enabled by the ordinary passageways by which inflation valve 42 is normally in communication with tire cavity 2B. Likewise, FIG. 7 shows an inflation valve 45 with a flange 46. In this configuration, the inflation valve 45 is mounted through a clearance hole 36 in safety ring 20. Thus, safety ring 20 is not directly sealed to wheel 1. Instead, the flange 46 on valve 45 (which is too large in diameter to fit through clearance hole 36) requires removal of valve 45 before safety ring 20 can be removed, thereby once again allowing depressurization via the air channel in communication with both tire cavity 2B and valve 45.

Figure 1:
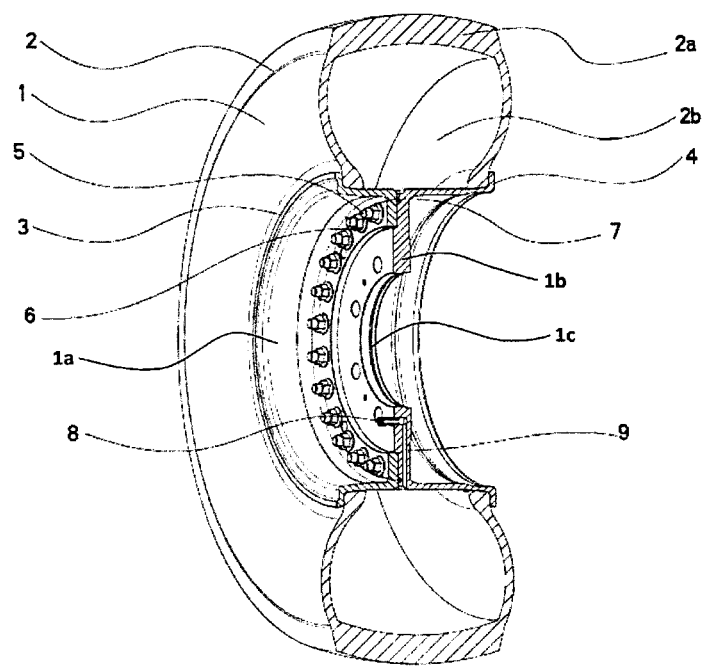
FIG. 1 provides a schematic perspective and partial cross-sectional view illustrating a typical two piece wheel assembly with tire in accordance with the teachings of prior art.
Figure 2:
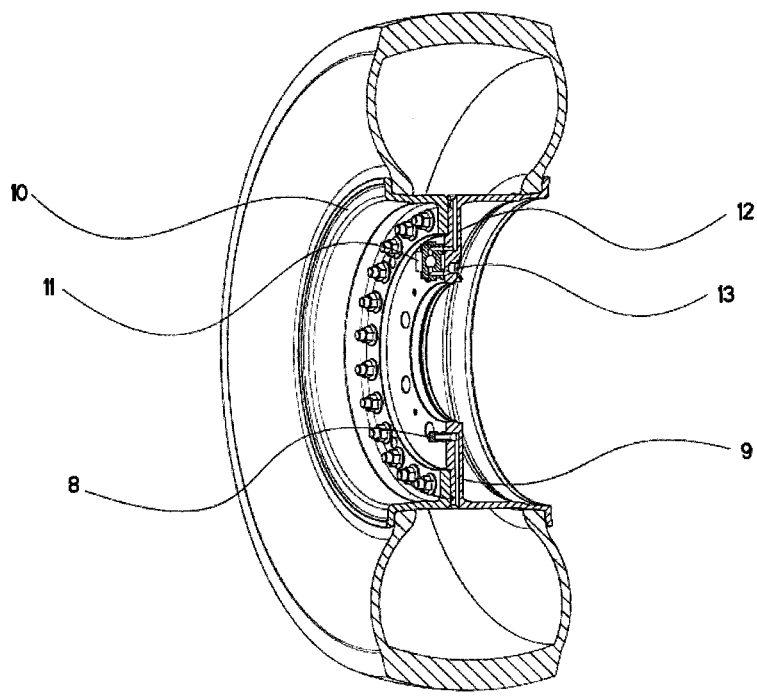
FIG. 2 provides a schematic perspective and partial cross-sectional view illustrating a typical two piece wheel assembly and tire with a central tire inflation (CTI) valve in accordance with the teachings of prior art.
Figures 8, 8A:
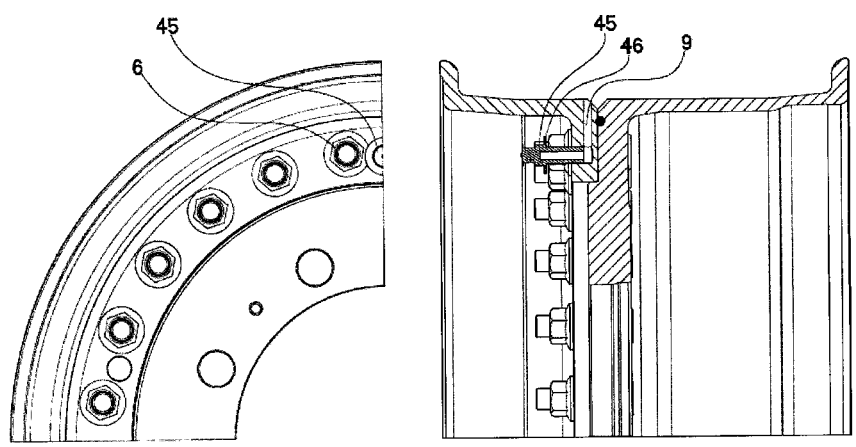
FIGS. 8 and 8A collectively provide schematic partial side and cross-sectional views illustrating an embodiment of the invention featuring an inflation valve with a flange that partially covers one or more assembly nuts.
Figures 9, 9A:
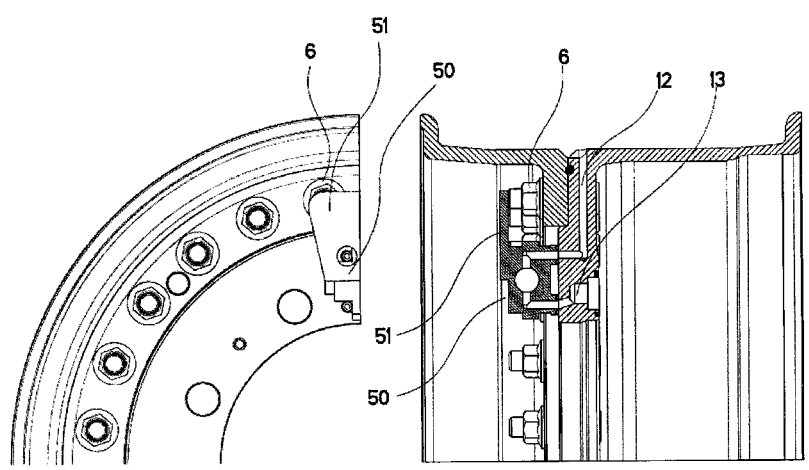
FIGS. 9 and 9A collectively provide schematic partial side and cross-sectional views illustrating an embodiment of the invention featuring a two-piece wheel with a CTI valve having a protruding section that completely or partially covers one or more assembly nuts.

In FIGS. 8 and 9, the next two examples shown, the blocking device is actually incorporated into the pressurization/depressurization valve. Thus, FIG. 8 shows an inflation valve 45 with a flange 46 that partially covers one or more assembly nuts 6. In this case, removal of the inflation valve 45 is once again necessary in order to remove assembly nut 6, resulting in a loss of tire pressure. And, in FIG. 9 a CTI valve 50 similar to that shown in FIG. 2 includes a protruding section or flange 51 that completely or partially covers one or more assembly nuts 6. Here, as in the embodiment illustrated in FIG. 8, removal of the CTI valve 50 is necessary in order to access assembly nuts 6, resulting in depressurization of tire cavity 2B. Also, with regard to FIGS. 8 and 9 where only a limited number of assembly nuts 6 are directly covered in the embodiment shown, a simple safety ring can be placed so as to cover all or a majority of the remaining nuts 6, with removal of this assembly ring requiring (as previously specified) removal of valve structure 45, 50.

Figure 10B:
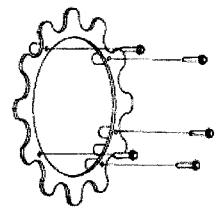
FIGS. 10, 10A and 10B collectively provide schematic partial side and cross-sectional views illustrating an embodiment of the invention featuring a safety ring that is scalloped so that only certain assembly nuts are blocked from removal.
Figures 10, 10A:
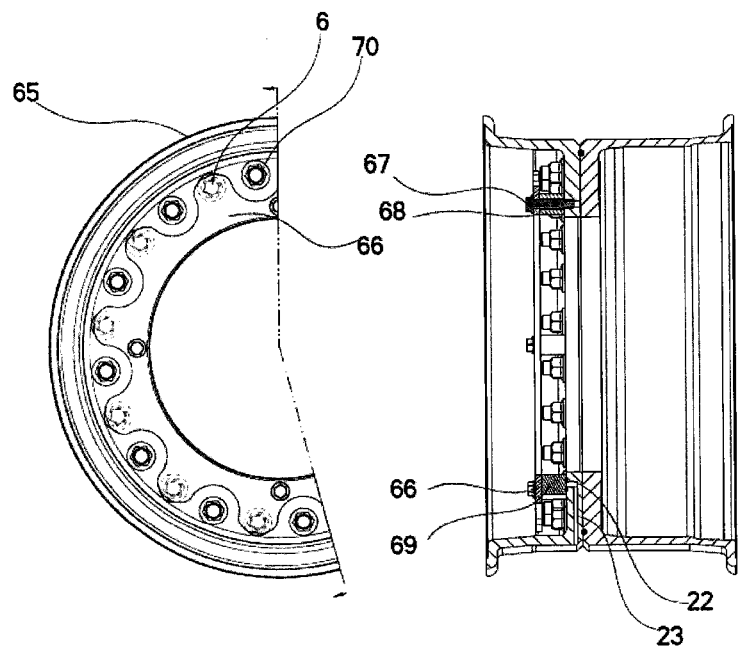
Figures 12, 12A:
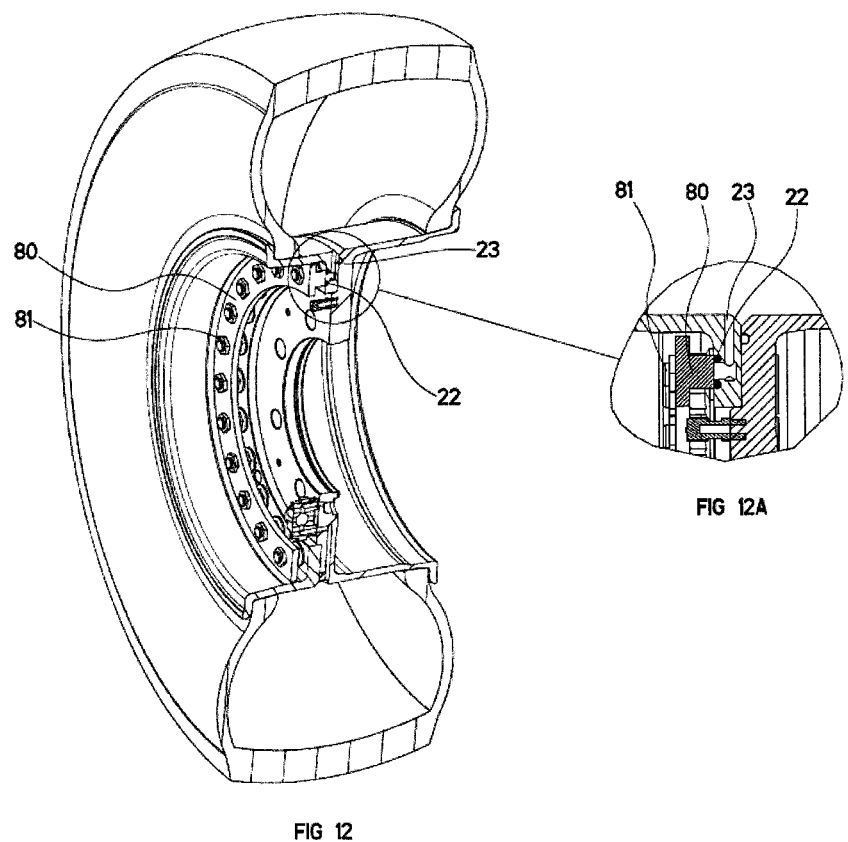
FIGS. 12 and 12A collectively provide schematic partial side and cross-sectional views illustrating an embodiment of the invention featuring a safety ring directly attached to the assembly studs via additional jam nuts.

Other possible embodiments include those shown in FIGS. 10, 11 and 12. FIG. 10 shows a safety ring 66 that is scalloped so that only certain assembly nuts 6 are blocked from removal. An embodiment like this might be used where both the assembly studs 5 and lug studs that attach the wheel 1 to the vehicle are on the same or similar bolt circle diameters. The scallops in safety ring 66 would allow removal of the lug nuts and removal of the wheel 1 from the vehicle without depressurizing the tire 2 but would require removal of the safety ring 66 and depressurization of the tire 2 before any of the wheel assembly nuts 6 could be removed. FIG. 11 shows individual safety pieces 75 with interactive safety valves 76 as opposed to a safety ring. The individual pieces 75 may cover a more limited number of assembly nuts 6 as opposed to all of the assembly nuts 6 and still be effective for their intended purpose. FIG. 12 illustrates still another embodiment of a safety ring 80. In this embodiment, the safety ring 80 is directly attached to the assembly studs 5 with additional jam nuts 81. The safety ring 80 still covers the seal passageway to the tire. In this embodiment, removal of the jam nuts 81 and removal of the safety ring 80 will, once again, relieve the tire pressure prior to allowing disassembly of the main wheel assembly nuts 6.

FIG. 13 illustrates another embodiment of a safety ring 90 with tabs 92. The safety ring 90 may be made in one or more parts (as illustrated) such that the tabs cover the assembly nuts to prevent disassembly. The safety ring 90 is secured to the wheel via screws 91. The safety ring 90 seals off air passageway 23 via o-ring 22.

Figures 14, 14A:
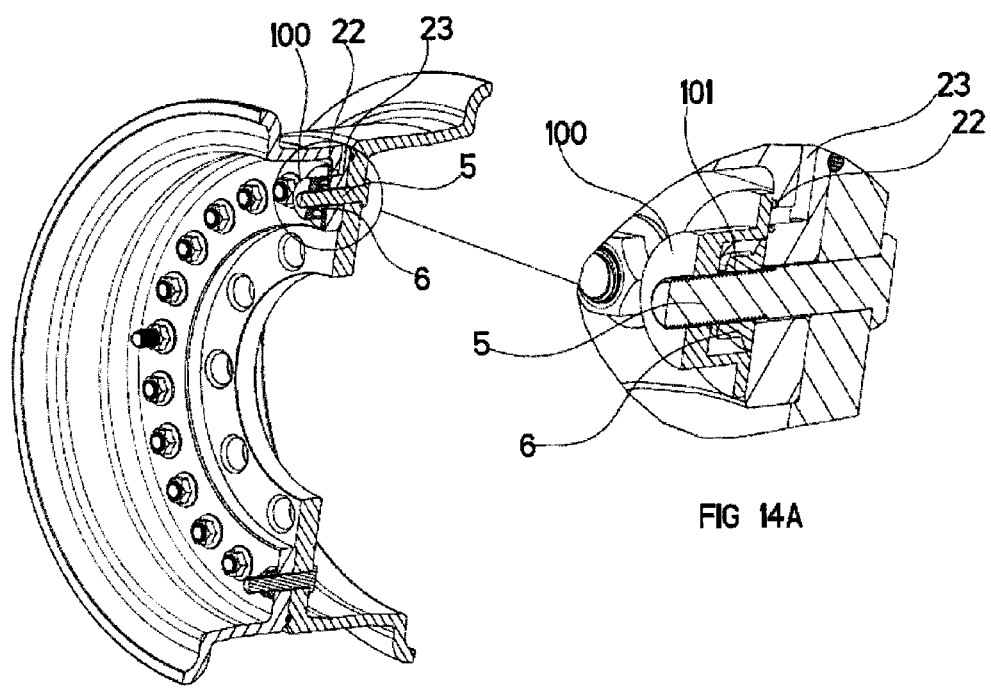
FIGS. 14 and 14A collectively provide a schematic perspective and partial cross sectional view illustrating an embodiment of the invention featuring individual protective assembly covers.

FIG. 14 illustrates an embodiment where individual covers 100 prevent disassembly unless the air pressure is relieved. The covers 100 screw onto assembly studs 5 via threads 101 and cover assembly nuts 6. They also seal off individual air passageways 23 via o-rings 22. Some or all assembly nuts 6 may be covered.

Figures 15, 15A:
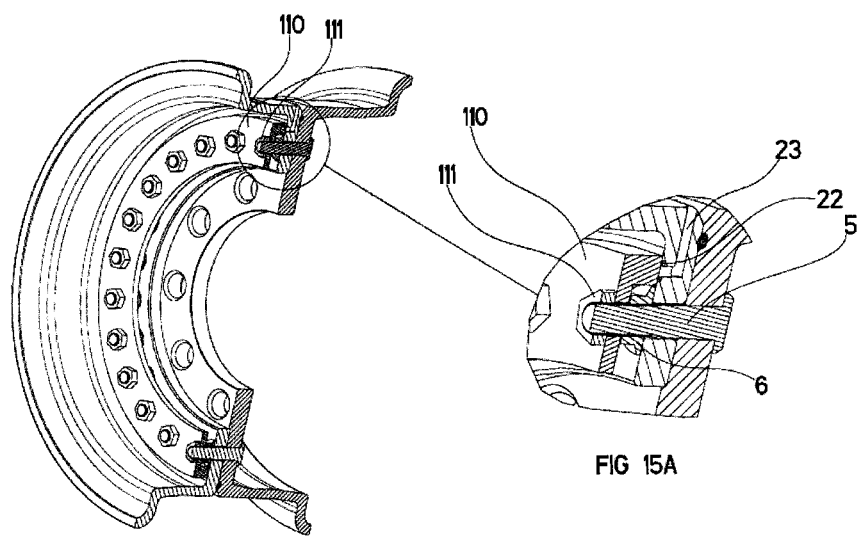
FIGS. 15 and 15A collectively provide schematic partial side and cross sectional views illustrating an embodiment that covers the assembly studs.

FIG. 15 illustrates an embodiment where some or all assembly nuts 6 are covered by safety ring 110. Safety ring 110 is attached to the wheel by jam nuts 111 and seal air passageway 23 via o-ring 22.

FIG. 16 illustrates an embodiment where the wheel cover 120 blocks disassembly of assembly nuts 6. The cover 120 may be attached to the outer wheel half 3 or inner wheel half 4 by any number of means. One such means of attachment is shown as stiffening ring 121 and screws 122.

Figures 17, 17A:
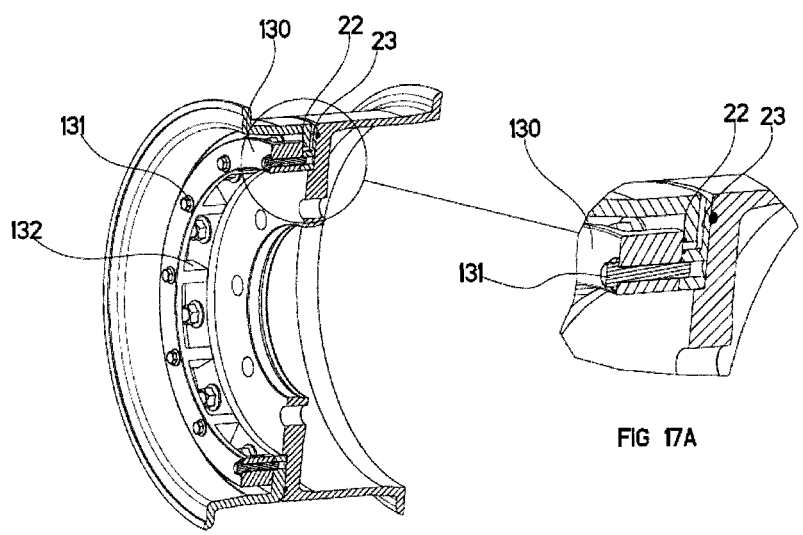
FIGS. 17 and 17A collectively provide a schematic perspective and partial cross sectional view illustrating another embodiment of a safety ring.

FIG. 17 illustrates a safety ring 130 attached to the wheel with screws 131. Safety ring 130 may use stand offs 132 to elevate the ring.

FIG. 18 illustrates a safety ring 144 attached to a multi piece wheel 140. The multi-piece wheel 140 may consist of a rim base 141 and side ring 142. Some multi-piece wheels also utilize a lock ring 143. Wheels like this are typically made from steel and are disassembled by removing the split lock ring 143 and side ring 143. Alternatively the side ring and lock ring can be combined into one split side ring that snaps into the groove in the rim base 141. In either wheel configuration the safety ring 144 prevents disassembly of the lock ring 143 or side ring 142 without first removing screws 122 and allowing air to escape via passageway 23.

FIG. 19 illustrates a wrench blocking ring 150 that prevents wrench access to assembly nuts 6. The screws 151 attach the wrench blocking ring 150 to the wheel to seal off air passageway 23 via o-ring 22. Since wrench access to assembly nuts 6 is blocked by the ring 150, the assembly nuts cannot be removed. It will be apparent to anyone skilled in the art that variety of wrench blocking configurations can be designed without departing from the spirit of the invention.

The previously described advantages and features of the invention are advantageously provided through and using the preferred embodiments previously illustrated and discussed. However, it should be clear to anyone knowledgeable about wheels that a variety of configurations may be utilized without departing from the spirit of the invention. Moreover, though tire-wheel assemblies typically utilize air as the pressurized fluid, it is clear that any pressurized fluid (gas or liquid) can be used. Moreover, the safety ring of the invention need not take the form illustrated in order to serve its purpose as a blocking member. It can, for example, be constructed as a safety wire to minimize weight.

Thus, numerous additional variations are possible without deviating from and/or exceeding the spirit and scope of the invention. Moreover, various features and functions disclosed above, or alternatives thereof, may be desirably combined into many other different systems or applications. Further, various presently unforeseen or unanticipated alternatives, modifications, variations or improvements therein may be subsequently made by those skilled in the art which are also intended to be encompassed by the claims that follow.

Finally, the following parts list for the drawing figures may be found to be of assistance in understanding more fully the concepts of our invention:

1 2-piece wheel assembly without CTIS
   1a rim portion
   1b disc portion
   1c hub bore area
2 Tubeless tire
   2a Tire body
   2b Tire cavity
3 Outer wheel half
4 Inner wheel half
5 Assembly stud
6 Assembly nut
7 Wheel sealing o-ring
8 Inflation valve
9 Internal passageway
10 2-piece wheel assembly with CTIS
11 CTI valve
12 Internal passageway
13 Internal passageway
20 Safety ring
21 Cap screw
22 Sealing o-ring
23 Air passageway
30 Safety ring that partially covers assembly nuts
35 Hub cap or wheel cover
36 Clearance hole for inflation valve
40 Safety ring for inflation valve
41 Threads for inflation valve
42 Inflation valve
45 inflation valve with flange
46 Inflation valve
50 CTI valve with flange
51 Flange
65 2-piece wheel assembly with scalloped safety shield
66 Scalloped safety shield
67 Attachment screws
68 Sleeve for attachment screws
69 Pin to block air
70 Lug nuts (attaches wheel to vehicle hub)

75 Individual safety shields
76 Safety valves
80 Safety ring
81 Jam nuts

The invention claimed is:

1. A wheel disassembly safety system for multi-piece wheels, comprising:
   a circular wheel rim formed in pieces held together by fastening elements which extend through overlapping portions of said pieces, said wheel rim having a flaring circumferential outer flange section formed coaxially on an outer end thereof and a flaring circumferential inner flange section formed coaxially on an inner end thereof, where said flange sections are both disposed to be engaged by beads of a tire mounted on the rim, with a transverse wall section intermediate said inner and outer ends extending transversely of the axis of said rim;
   an air passageway in said rim in communication with an interior of the tire and having an exterior opening that can be unsealed so as to cause depressurization of said tire via said air passageway, wherein said exterior opening is at an outer face of said transverse wall section; and
   a blocking member positionable in a blocking position preventing access to at least some of said fastening elements to prevent disassembly of the pieces forming the wheel rim until the blocking member is moved from said blocking position, where movement of the blocking member from said blocking position one of:
      unseals said exterior opening causing depressurization of the said tire mounted on the rim,
      causes removal of an element sealing said exterior opening causing depressurization of the said tire mounted on the rim, and
      requires removal of an element sealing said exterior opening causing depressurization of the said tire mounted on the rim.

2. A wheel disassembly safety system as described in claim 1, wherein at least one of
   said pieces comprise an outer rim piece and an inner rim piece joined together by bolts or studs inserted through overlapping portions of said outer rim piece and said inner rim piece such that one of a head of the bolt or a nut placed thereon are accessible for loosening or tightening at the outer face of said transverse wall section and obtaining access to said nut or head of a bolt for loosening and removal requires movement of the blocking member from the blocking position,
   said blocking member sealingly abuts an exterior opening of an air passageway when in the blocking position, such that movement of the blocking member from the blocking position unseals said exterior opening causing depressurization of said tubeless tire via said air passageway,
   said blocking member is held in the blocking position by its attachment to at least one of the wheel rim, a bolt or stud inserted through overlapping rim piece portions, and the nut or head of the bolt inserted through overlapping rim piece portions,
   said blocking member prevents access to a plurality of fastening elements,
   said wheel disassembly safety system includes a plurality of blocking members, and
   one of a blocking member and a plurality of blocking members is arranged to block access to a symmetrical configuration of fastening elements.

3. A wheel disassembly safety system as described in claim 2, wherein said wheel disassembly safety system at least one of:
   includes a plurality of individual safety pieces acting as blocking members, and
   said plurality of safety pieces are arranged to block access to a symmetrical configuration of fastening elements.

4. A wheel disassembly safety system as described in claim 1, wherein said blocking member forms a ring shaped member that is positionable in a blocking position to prevent access to at least some of said fastening elements to prevent disassembly of the pieces forming the wheel rim until the ring shaped member is moved from said blocking position.

5. A wheel disassembly safety system as described in claim 4, wherein said ring shaped member forms at least a portion of one of a hub cap and a wheel cover.

6. A wheel disassembly safety system as described in claim 4, wherein said safety ring has a scalloped configuration so that only certain fastening elements are blocked.

7. A wheel disassembly safety system as described in claim 4, wherein said safety ring is held in blocking position by its attachment to assembly studs via additional jam nuts.

8. A wheel disassembly safety system as described in claim 4, wherein said safety ring is at least one of:
   divided into separate sections,
   includes tabs serving to block access to fastening elements,
   includes stand-offs, and
   includes wrench blocking rings.

9. A wheel disassembly safety system as described in claim 1, wherein an inflation valve for the tire is connected directly to the blocking member so as to sealingly engage the exterior opening of the air passageway when the blocking member is in the blocking position, but such that movement of the blocking member from the blocking position unseals said exterior opening causing depressurization of said tubeless tire via said air passageway.

10. A wheel disassembly safety system as described in claim 1, wherein an inflation valve for the tire is connected directly through the blocking member so as to sealingly engage the exterior opening of the air passageway, but such that movement of the blocking member from the blocking position requires removal of the inflation valve from sealing engagement with the exterior opening causing depressurization of said tubeless tire via said air passageway.

11. A wheel disassembly safety system as described in claim 10, wherein the inflation valve for the tire has a flange which blocks removal of the blocking member until the inflation valve is removed.

12. A wheel disassembly safety system as described in claim 1, wherein a flange of an inflation valve acts as a blocking member.

13. A wheel disassembly safety system as described in claim 12, wherein said valve is a CTI valve.

14. A wheel disassembly safety system as described in claim 1, wherein an individual assembly cover serves as a blocking member.

15. A wheel disassembly safety system, comprising:
   a wheel, wherein the wheel comprises a first rim and a second rim held together by a plurality of fastening elements which extend through overlapping portions of the first and second rims, wherein the wheel defines an internal air passageway having a first end and a second end, wherein the first end of the internal air passageway is at an outer face of a transverse wall section of the wheel; and
   a blocking member removably connected to the wheel, wherein the blocking member covers the first end of the internal air passageway and one or more of the plurality of fastening elements, wherein:

removal of the blocking member from the wheel unseals the first end of the internal air passageway;

if a tire is mounted on the wheel, the second end of the internal air passageway is in communication with an inner cavity of the tire; and if the tire is mounted on the wheel, removal of the blocking member depressurizes the tire via the internal air passageway.

16. The system of claim 15, further comprising a nut, wherein the nut is connected to one of the fastening elements.

17. The system of claim 15, wherein the blocking member is substantially annular.

18. The system of claim 15, further comprising a plurality of cap screws, wherein the cap screws:

are removably connected to the wheel;

pass through the blocking member; and removably connect the blocking member to the wheel.

19. The system of claim 15, further comprising a sealing member, wherein the sealing member:

is positioned between the blocking member and the wheel; and surrounds the first end of the internal air passageway.

20. The system of claim 19, wherein the sealing member is an o-ring.

* * * * *